US010956161B2

(12) United States Patent
Sadasivam et al.

(10) Patent No.: US 10,956,161 B2
(45) Date of Patent: *Mar. 23, 2021

(54) INDIRECT TARGET TAGGED GEOMETRIC BRANCH PREDICTION USING A SET OF TARGET ADDRESS PATTERN DATA

(71) Applicant: International Business Machines Corporation, Armonk, NY (US)

(72) Inventors: Satish Kumar Sadasivam, Erode (IN); Puneeth A. H. Bhat, Bangalore (IN); Shruti Saxena, Kanpur (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/247,714

(22) Filed: Jan. 15, 2019

(65) Prior Publication Data
US 2019/0163479 A1 May 30, 2019

Related U.S. Application Data

(63) Continuation of application No. 15/498,678, filed on Apr. 27, 2017, now Pat. No. 10,261,797.

(51) Int. Cl.
*G06F 9/38* (2018.01)
*G06F 9/30* (2018.01)

(52) U.S. Cl.
CPC ........ *G06F 9/3806* (2013.01); *G06F 9/30021* (2013.01); *G06F 9/3844* (2013.01); *G06F 9/3848* (2013.01)

(58) Field of Classification Search
None
See application file for complete search history.

(56) References Cited

U.S. PATENT DOCUMENTS

| | | | | |
|---|---|---|---|---|
| 5,577,217 A | * | 11/1996 | Hoyt | G06F 9/3848 711/140 |
| 5,835,754 A | * | 11/1998 | Nakanishi | G06F 9/3806 712/239 |
| 7,409,535 B2 | | 8/2008 | Park et al. | |
| 8,555,040 B2 | * | 10/2013 | Beaumont-Smith | G06F 9/3806 712/238 |
| 9,239,721 B2 | | 1/2016 | Bonanno et al. | |
| 9,792,123 B2 | * | 10/2017 | Manoukian | G06F 9/3844 |

(Continued)

OTHER PUBLICATIONS

Accelerated Examination Support Document, U.S. Appl. No. 15/844,898, filed Dec. 12, 2017, 31 pgs.

(Continued)

*Primary Examiner* — Eric Coleman
(74) *Attorney, Agent, or Firm* — Robert J. Shatto

(57) ABSTRACT

Provided is a method for predicting a target address using a set of Indirect Target TAgged GEometric (ITTAGE) tables and a target address pattern table. A branch instruction that is to be executed may be identified. A first tag for the branch instruction may be determined. The first tag may be a unique identifier that corresponds to the branch instruction. Using the tag, the branch instruction may be determined to be in a target address pattern table, and an index may be generated. A predicted target address for the branch instruction may be determined using the generated index and the largest ITTAGE table. Instructions associated with the predicted target address may be fetched.

17 Claims, 5 Drawing Sheets

(56) References Cited

U.S. PATENT DOCUMENTS

| | | | |
|---|---|---|---|
| 9,823,932 B2* | 11/2017 | Bouzguarrou | G06F 9/3848 |
| 2002/0199091 A1* | 12/2002 | Tago | G06F 9/3806 |
| | | | 712/240 |
| 2008/0256347 A1* | 10/2008 | Eickemeyer | G06F 9/30061 |
| | | | 712/240 |
| 2011/0078425 A1* | 3/2011 | Shah | G06F 9/3851 |
| | | | 712/239 |
| 2013/0311760 A1* | 11/2013 | Kothari | G06F 9/3844 |
| | | | 712/240 |
| 2015/0363201 A1 | 12/2015 | Eickemeyer et al. | |
| 2016/0026470 A1 | 1/2016 | Manoukian | |
| 2017/0139717 A1 | 5/2017 | Hornung et al. | |
| 2017/0168825 A1* | 6/2017 | Bonanno | G06F 9/3861 |
| 2017/0371669 A1 | 12/2017 | Krishna et al. | |
| 2018/0314523 A1 | 11/2018 | Sadasivam et al. | |
| 2018/0314525 A1 | 11/2018 | Sadasivam et al. | |

OTHER PUBLICATIONS

Bhansali et al., "Exploring Correlation for Indirect Branch Prediction," 2012, pp. 1-4, publisher ncsu.edu.

Ishii et al., "Bimode Cascading: Adaptive Rehashing for ITTAGE Indirect Branch Predictor", 2nd JILP Workshop on Computer Architecture Competitions (JWAC-2), 2011—jilp.org, 4 pgs.

Chang et al., "Improving Branch Prediction Accuracy by Reducing Pattern History Table Interference," International Journal of Parallel Programming Oct. 1997, vol. 25, Issue 5, pp. 339-362, publisher Springer Link.

List of IBM Patents or Patent Applications Treated as Related, Jan. 13, 2019, 2 pgs.

Otiv et al., "H-Pattern: A Hybrid Pattern Based Dynamic Branch Predictor with Performance Based Adaptation," Department of Computer Science and Engineering, Indian Institute Technology, Madras, Chenmai, India, 5 pgs., 2014.

Seznec et al., "A case for (partially) TAgged GEometric history length branch prediction," ©2005 AI Access Foundation and Morgan Kaufmann Publishers, pp. 1-23.

Seznec, A. "A 64-Kbytes ITTAGE indirect branch predictor*," JWAC-2: Championship Branch Prediction, Jun. 2011, San Jose, United States, pp. 1-4, publisher HAL-INRIA.

Stack Overflow, "Switch case assembly level code," 4 pgs., printed Apr. 24, 2017.

\* cited by examiner

INDIRECT TARGET TAGGED GEOMETRIC BRANCH PREDICTION USING A SET OF TARGET ADDRESS PATTERN DATA

BACKGROUND

This disclosure relates generally to computer systems and, more particularly, relates to Indirect Target TAgged GEometric (ITTAGE) target address prediction using a set of target address pattern data in a pipelined microprocessor architecture.

The amount of branch instructions used in microprocessor architectures is increasing. In computer architecture, a Target Address Predictor is a digital circuit that tries to guess the target address of an indirect branch before that branch gets executed. Address prediction plays a critical role in achieving high effective performance in most of the pipelined microprocessor architectures. The instruction fetch continues from the guessed target of the indirect branch is speculatively executed

SUMMARY

Aspects of the disclosure relate to method, system, and computer program product for utilizing a unified Indirect Target TAgged GEometric (ITTAGE) design along with the addition of a target address pattern table for pattern-based target address prediction. A branch instruction that is to be executed may be identified. A first tag for the branch instruction may be determined. The first tag may be a unique identifier that corresponds to the branch instruction. Using the tag, the branch instruction may be determined to be in a target address pattern table, and an index may be generated. A predicted target address for the branch instruction may be determined using the generated index and the largest ITTAGE table. Instructions associated with the predicted target address may be fetched.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
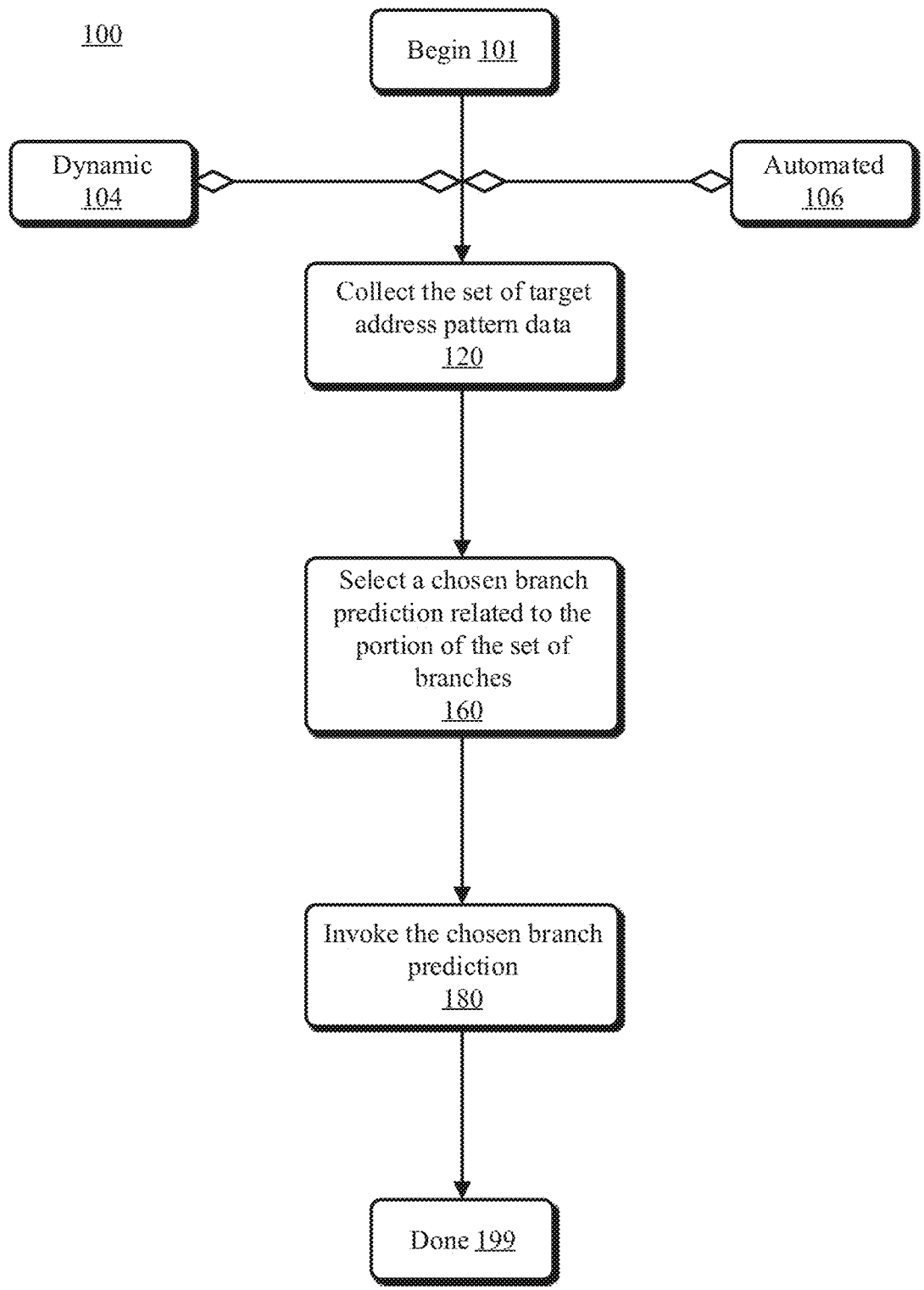
FIG. 1 illustrates a flowchart of an example method for Indirect Target TAgged GEometric (ITTAGE) branch prediction using a set of target address pattern data in a pipelined microprocessor architecture, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to utilizing a unified Indirect Target TAgged GEometric (ITTAGE) design along with the addition of a table for pattern-based target address prediction. ITTAGE tables may be utilized to track branches missing a long history length table using a tagged pattern table. The tagged history patterns may be tracked for a selective set of branches missing in the long history predictor table. The previous tagged pattern may be utilized to index into existing ITTAGE tables to derive a target address prediction.

In computer architecture, a Target Address Predictor may include a digital circuit which attempts to predict the target address of an indirect branch before the branch is executed. Address prediction may achieve higher effective performance in pipelined microprocessor architectures. An instruction fetch may be speculatively executed based on a prediction. If a branch target address is incorrectly predicted, the speculatively executed (or fetched) instructions may be discarded and the pipeline may start over with the correct path. Restarting the instruction execution may result in a delay and lower performance. ITTAGE prediction may experience lower performance with branches which are dependent on patterns in the previous jump address. Pattern caches may be utilized to enhance performance, but by working as an independent predictor, they may be costly in terms of hardware real-estate. It may be desired to enhance prediction accuracy while utilizing a lower amount of hardware with respect to a threshold/benchmark level/value. ITTAGE target address prediction using a set of target address pattern data, as disclosed herein, may utilize less hardware and enhance pattern-based prediction for ITTAGE predictors.

Aspects of the disclosure relate to a system, method, and computer program product for ITTAGE target address prediction using a set of target address pattern data in a pipelined microprocessor architecture. The set of target address pattern data for a portion of the set of branches may be collected coupled with a set of ITTAGE data which indicates a set of branch misses for a set of branches. A chosen target address prediction related to the portion of the set of branches may be selected based on an ITTAGE target address prediction technique that utilizes the set of target address pattern data which is coupled with the set of ITTAGE data. The chosen target address prediction may be invoked in the pipelined microprocessor architecture.

In embodiments, a target address pattern history table may be utilized to index a longest history TAGE table. Local and default predictions may be derived from a tag-less local predictor indexed directly with an instruction address (e.g., program counter). In embodiments, a TAGE prediction may be derived using an Indirect TAGE prediction algorithm. A pattern table may be maintained for selective branches. The program counter, Global History Vector, and pattern may be utilized to index the last TAGE table which uses the longest history. The final prediction may be derived using ITTAGE logic. In embodiments, the TAGE prediction may be selected. If a TAGE prediction does not exist, the default prediction may be selected. Altogether, aspects of the disclosure can have performance or efficiency benefits. Aspects may save resources such as bandwidth, disk, processing, or memory. As an example, ITTAGE target address prediction using a set of target address pattern data may enhance performance, thereby saving hardware space without reducing performance.

Turning now to the figures, FIG. 1 illustrates a flowchart of an example method 100 for ITTAGE branch prediction using a set of target address pattern data in a pipelined microprocessor architecture, according to embodiments. ITTAGE branch prediction may relate to a method of branch prediction which includes a base predictor. The base predictor may be backed with several tagged predictor components which are indexed with increasing history lengths. Execution history pattern information may be collected on-the-fly of the program execution by updating the pattern history information in the branch history pattern table of the predictor (e.g., no pre-runs of the program are necessary). ITTAGE branch prediction may be performed in a pipelined microprocessor architecture. Rather than stall when a branch is encountered, a pipelined microprocessor may utilize branch prediction to speculatively fetch and execute instructions along the predicted path. The method 100 may begin at block 101.

In embodiments, the collecting, the selecting, the invoking, and the other steps described herein may each be executed in a dynamic fashion at block 104. The steps described herein may be executed in a dynamic fashion to streamline ITTAGE branch prediction using the set of target address pattern data in the pipelined microprocessor architecture. The set of operational steps may occur in real-time, ongoing, or on-the-fly. As an example, one or more of the operational steps described herein may be carried-out in an ongoing basis to facilitate, promote, or enhance ITTAGE branch prediction using a set of target address pattern data in a pipelined microprocessor architecture. Other examples may also be possible.

In embodiments, the collecting, the selecting, the invoking, and the other steps described herein may each be executed in an automated fashion at block 106. The steps described herein may be executed in an automated fashion without user intervention. The operational steps may each occur in an automated fashion without user intervention or manual action (e.g., using automated computer machinery, fully machine-driven without manual stimuli). The automated operational steps may be performed by firmware or the like. Other examples may also be possible.

At block 120, the set of target address pattern data for a portion of the set of branches may be collected. Generally, collecting can include capturing, gathering, aggregating, accumulating, acquiring, obtaining, receiving, or attaining. The set of target address pattern data may include behaviors, features, characteristics, values, parameters, parameter values, weights, or statistics with respect to a predicted endpoint, result, course, or destination of an instruction in a pipelined microprocessor architecture. Target address pattern data may include data related to a predicted target address of an indirect branch (e.g., destination, estimated time, accuracy, reliability, branch/branches taken, history). The set of target address pattern data may be collected for a portion (e.g., part, set, piece, subset) of the set of branches. The set of target address pattern data may be coupled with a set of ITTAGE data. The set of ITTAGE data may include behaviors, features, characteristics, values, parameters, parameter values, weights, weights, or statistics related to ITTAGE branch prediction. The set of ITTAGE data may include a set of parameters, values, or characteristics indicating the history of a branch or set of branches. The set of ITTAGE data may indicate a set of branch misses for a set of branches. The set of branch misses may include branch instructions/commands/queries which are missing the longest history length table used for ITTAGE branch prediction. The set of branch misses may include mispredictions for branches. The collecting may be performed in the pipelined microprocessor architecture.

Consider the following example. The set of target address pattern data may be collected for a portion of the set of branches. Target address data may be collected for a group of branches including Branch A, Branch B, Branch C, and Branch D. The collected target address pattern data may include information pertaining to the predicted target location of each of the four branches. As an example, the predicted target location of Branch A may include a separate Branch E. The collected target address pattern data may include existing ITTAGE data. In certain embodiments, the ITTAGE data may be stored in a table. The ITTAGE table may contain information regarding mispredictions for branches. Other examples of collecting the set of target address pattern data may also be possible.

At block 160, a chosen branch prediction may be selected. Generally, selecting may include choosing, specifying, resolving, electing, designating, or identifying. The chosen branch prediction may include the predicted branch/route/path which is considered more appropriate (e.g., with respect to saving processing, memory, time, or the like) for the instruction execution. As an example, a first branch prediction may utilize less memory/processing than other branch predictions. The chosen branch prediction may include the first branch prediction. Other examples may also be possible. The chosen branch prediction may relate to (e.g., connected with, associated/linked with) the portion (e.g., piece, set, part, subset) of the set of branches. The selecting may be performed based on an ITTAGE branch prediction technique (e.g., using tagged predictor components indexed with increasing history lengths). The ITTAGE branch prediction technique may utilize the set of target address pattern data which is coupled with the set of ITTAGE data in the pipelined microprocessor architecture.

Consider the following example. The chosen branch prediction may be selected based on an ITTAGE branch prediction technique that utilizes the set of target address pattern data. The target address pattern data along with the ITTAGE data tables may be tracked for each of branches A, B, C, and D. Previous target address patterns (e.g., destination, estimated time, reliability) for the four branches may be tracked and utilized to index the ITTAGE data tables. Branches A and C may be indicated (via the target address pattern data) to have a lower (e.g., 35%) reliability. The mispredictions indicated in the ITTAGE tables may signify branches A, C, and D are mispredictions/misses. Branch B may be selected as the chosen branch prediction. Other examples of selecting a chosen branch prediction based on an ITTAGE branch prediction technique may also be possible.

At block 180, the chosen branch prediction may be invoked in the pipelined microprocessor architecture. Generally, invoking can include initiating execution, executing, instantiating, carrying-out, launching, summoning, performing, or processing. A processor may invoke the chosen branch prediction by fetching a branch instruction which indicates whether a branch will be "taken" or "not taken." If a branch will be taken, the processor may fetch the target instructions. If a branch will not be taken, the processor may fetch the fall-through code. The target instructions may include a command, query, or the like related to a specific operation to be processed/performed by the computing system (e.g., pipelined microprocessor).

Consider the following example. As described herein, the ITTAGE table and set of branch misses may determine that Branch B is the more appropriate prediction of the portion of the set of branches due to a number of mispredictions/misses. Branch B may be invoked in the pipelined microprocessor architecture. Branch B may be utilized to process an instruction. Other examples of invoking the chosen branch prediction in the pipelined microprocessor architecture may also be possible.

Method 100 concludes at block 199. Aspects of method 100 may have performance or efficiency benefits related to ITTAGE branch prediction using a set of target address pattern data. Aspects of method 100 may utilize one unified ITTAGE design along with a table to enhance pattern-based prediction for ITTAGE branch prediction. ITTAGE branch prediction using a set of target address pattern data may be integrated with the current ITTAGE mechanism. Not all branches may be considered for pattern-based selection. Instead, only a portion of the set of branches may be considered. The ITTAGE table may be utilized with a supporting pattern table for branches which are dependent on a previous target address of the branch instruction. ITTAGE branch prediction using a set of target address pattern data may desire/require a lower hardware budget. Aspects may save resources such as bandwidth, disk, processing, or memory. As an example, processing may be saved by selecting a branch prediction. The chosen branch prediction may include a path/route which requires less processing than other paths/routes. Other examples of saving processing using ITTAGE branch prediction using a set of target address pattern data may also be possible.

Figure 2:
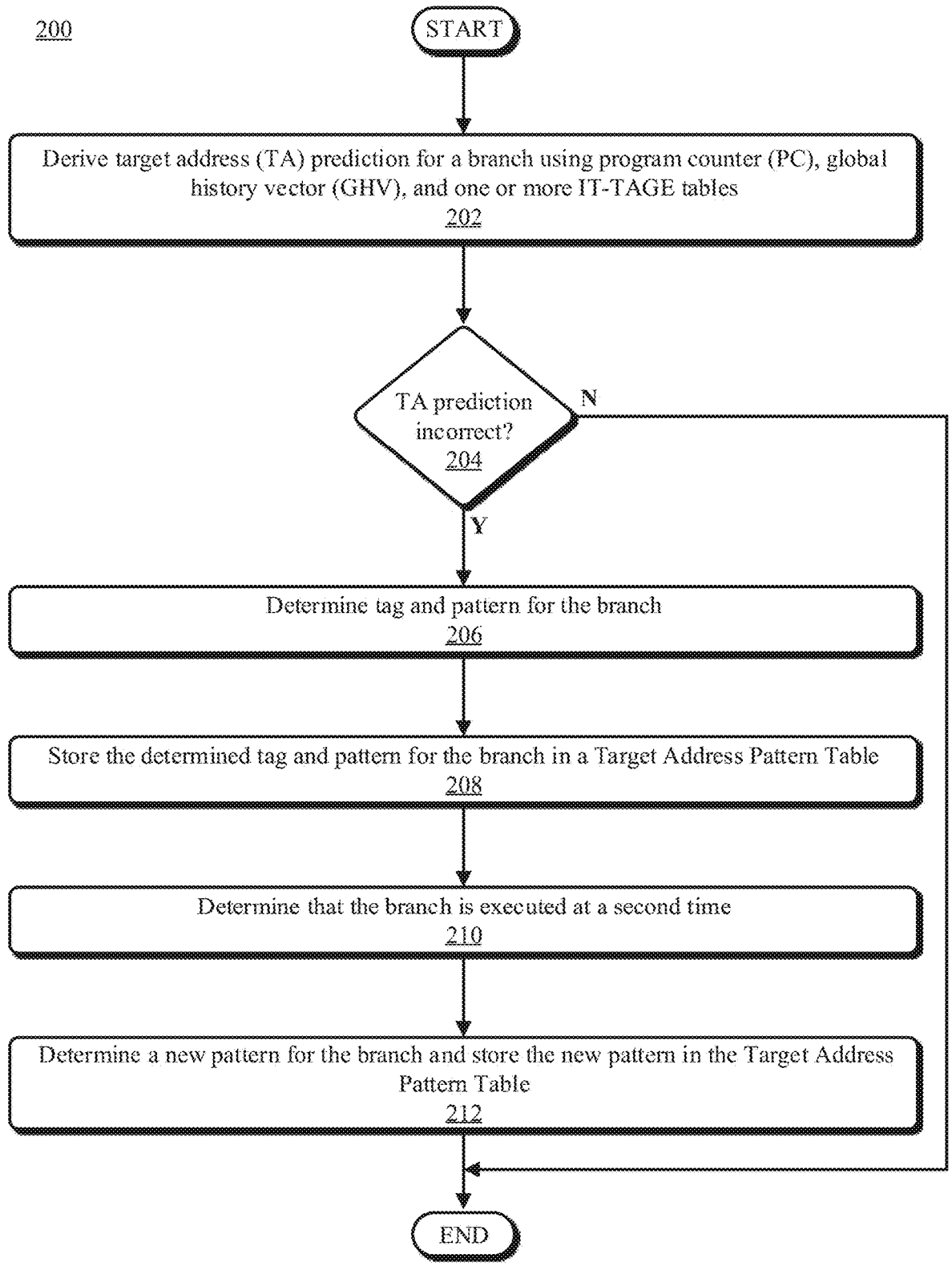
FIG. 2 illustrates a flowchart of an example method for generating and maintaining a target address pattern table having a set of target address pattern data, in accordance with embodiments of the present disclosure.

FIG. 2 illustrates a flowchart of an example method 200 for generating and maintaining a target address pattern table having a set of target address pattern data, in accordance with embodiments of the present disclosure. In some embodiments, the method 200 may be executed by a computer system (e.g., by hardware or software in computer system 501 shown in FIG. 5). In some embodiments, the method 200 may be executed by a specialized digital circuit (e.g., a processing circuit), such as a Target Address Predictor (TAP), within (or alongside) a microprocessor or other computer hardware. The method 200 may begin at operation 202, where the TAP may derive a target address prediction for an incoming branch.

In some embodiments, the TAP may derive (e.g., determine) the target address prediction using the program counter (PC), the global history vector (GHV), and one or more ITTAGE tables. For example, the system may keep four TAGE tables, each TAGE table having a different size. The TAP may calculate an index using the PC and the GHV (e.g., by XORing them together). The TAP may then use the index to attempt to retrieve a target address prediction from each of the TAGE tables. The TAP may then select as the TAGE prediction the target address from the largest TAGE table in which a predicted target address was found. If the TAP is unable to find a target address prediction from the TAGE tables, it may use a default prediction using a local tag-less predictor as the target address prediction.

XOR-folding may relate to computing a hash twice the desired length, then XOR-ing the bits in the upper half with the bits in the lower half. The history pattern may comprise of bits extracted from the actual target address of the branch. The extracting may be performed by folding and XOR-ing logic. Consider the following example. An individual target address of Branch A may be analyzed. The target address may be organized or inspected and transformed into a data report. Based on the analysis, a history pattern comprised of bits may be extracted from the target address. The extracting may be performed by folding and XOR-ing logic. XOR-folding may assign a value to an output based on whether multiple inputs are the same or different. The XOR-folding technique may translate the target address data into an understandable structure in order to choose an appropriate target address prediction. Other examples of analyzing an individual target address and generating an individual entry using an XOR-folding technique may also be possible.

After deriving a target address prediction at operation 202, the TAP may determine whether the target address prediction is correct at decision block 204. In some embodiments, the TAP may determine that the target address prediction is incorrect if it is unable to find a target address for the branch in the largest TAGE file. For example, the TAP may compare a tag for the branch to a tag associated with the target address retrieved from the largest TAGE file. If the tags do not match, indicating that the indexed record in the TAGE file corresponds to a different branch, the TAP may consider the target address prediction to be wrong.

In some embodiments, the processor may fetch and speculatively execute the instructions from the predicted target address. The processor may then determine that the speculatively executed instructions were not correct (e.g., by completing processing of the function that determines the target address within the branch to be executed), and may discard that executed instructions and restart the pipeline using the correct target address. Accordingly, the TAP (or the processor) may determine that the target address prediction was wrong in response to determining that the speculatively executed instructions were incorrect. In some embodiments, the branch may exist in the largest (or any other) TAGE file, but the GHV may not be long enough to index for the target branch, causing the predicted target address to be incorrect.

If the TAP determines that the target address prediction was correct at decision block 204, the method 200 may end. Otherwise, the TAP may determine a tag and a pattern for the branch at operation 206. The tag may be an identifier for the branch that is being, or is predicted to be, executed. The tag may be generated in any manner otherwise consistent with this disclosure. For example, the tag may be determined using according to the standard IT-TAGE process. In these embodiments, the tag for a branch in the generated target address pattern table may be identical to the tag for the branch in the TAGE files.

The pattern may be an identifier for the target address associated with the branch (e.g., the last target address executed for the branch). The pattern (also referred to herein as the "history pattern") may be generated or determined using any process otherwise consistent with this disclosure. In some embodiments, the pattern may be a portion of the full target address. In some embodiments, the pattern may be the full target address. In some embodiments, the pattern for the branch may include a few bits that are extracted from the branch's actual target address (e.g., the target address of the instructions executed the last time the branch was executed).

The pattern may be extracted using folding and XORing logic on the actual target address.

After determining the tag and pattern for the branch at operation 206, the TAP may store the determined tag and pattern for the branch in a target address pattern table. The target address pattern table may be a table stored alongside the TAGE files (or table) to predict the target address of a branch. The target address pattern table may include records for each branch that previously experienced a prediction miss using the TAGE files. In other words, the target address pattern table may include patterns only for selective branches, such as the branches that are not correctly predicted using the TAGE files alone.

The target address pattern table may be directly indexed using the branch instruction address, and information regarding the branches in the target address pattern table (e.g., patterns, tags, etc.) may be maintained independent of the GHV and TAGE files. The target address pattern table may be stored using any suitable hardware (e.g., memory). For example, in some embodiments the target address pattern table may be stored using a plurality of shift registers.

After storing the tag and pattern in the target address pattern table at operation 208, the TAP may determine that the branch is being executed again at operation 210. The branch may be re-executed at a second time that is any time subsequent to the first time the branch was executed. After determining that the branch is executed a second time at operation 210, the TAP may determine a new pattern for the branch at operation 212.

Figure 3:
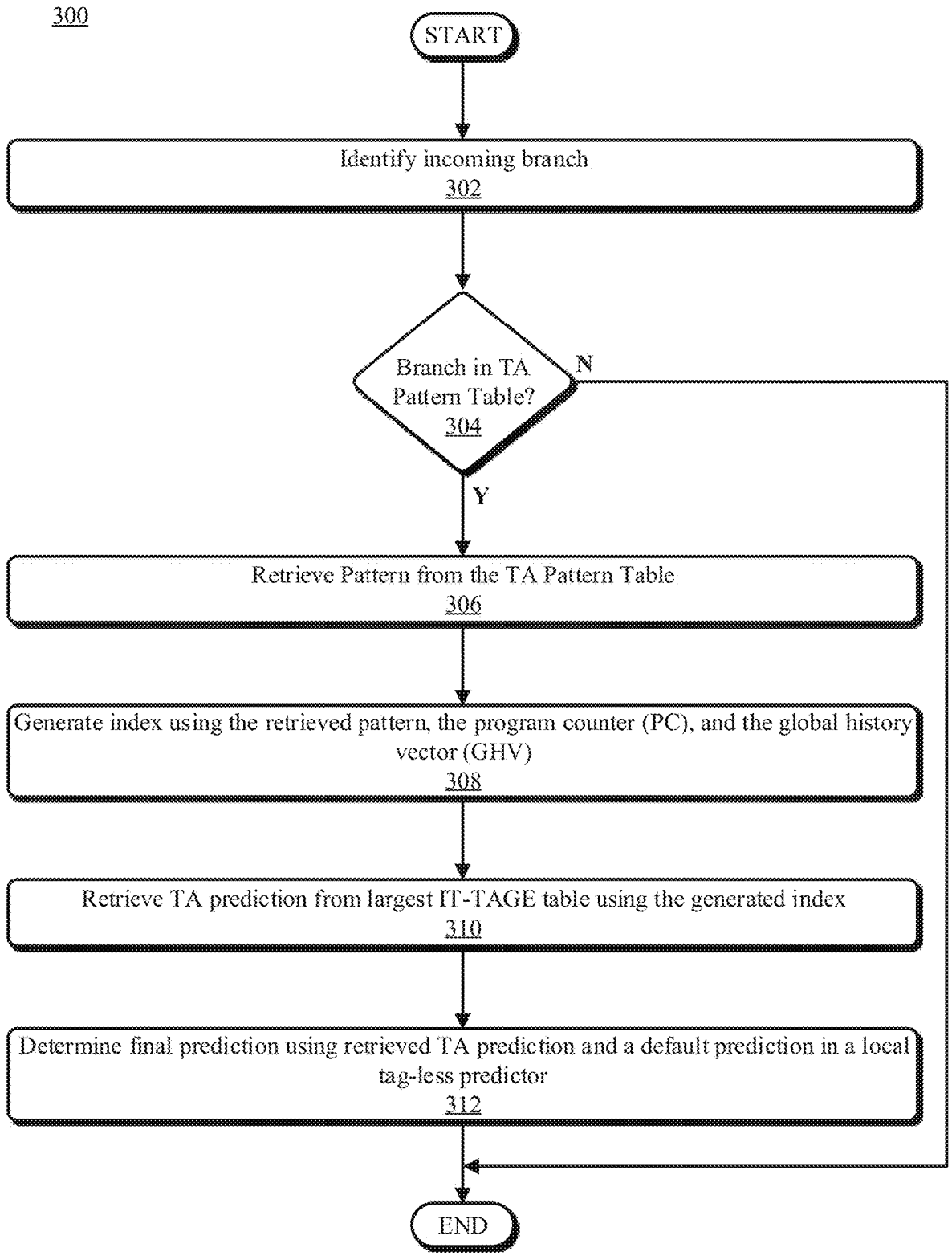
FIG. 3 illustrates a flowchart of an example method for predicting a target address of a branch using a set of ITTAGE tables and a target address pattern table, in accordance with embodiments of the present disclosure.

Unlike the target address predicted and checked at operations 202 and 204, the predicted target address for the second execution of the branch may have been made using the target address pattern table, as described in more detail in reference to FIG. 3. The TAP may store the new pattern, which may be derived using the actual target address executed during the second execution of the branch, in the target address pattern table. The new pattern may replace the previous pattern associated with the branch. Accordingly, the target address pattern table may include a single pattern for each branch maintained in the table. Once a particular branch has an incorrect prediction, and is accordingly added to the target address pattern table, the TAP will continue to track and monitor the particular branch. In other words, the TAP may update the target address for each of the branches in the target address pattern table every time an included branch (i.e., a branch in the target address pattern table) is executed. In some embodiments, the TAP may only determine a new pattern for a branch in the target address pattern table in response to a predicted target address for the branch being incorrect. The stored pattern for each branch in the target address pattern table may correspond to the last target address correctly executed for the respective branch. After updating the target address pattern table at operation 212, the method 200 may end.

As an example of method 200, a microprocessor may be configured to execute code that includes a switch statement. The switch statement may generate a branch that is always going to be taken, but that has numerous paths within it (e.g., numerous possible target addresses). The branch may be identified as "Branch D." The switch statement may execute a function that determines the day of the week as a number between 0 and 6, with 0 being returned if it is Sunday, 1 being returned if it is Monday, and so on. Accordingly, the branch associated with the switch statement may include 7 different target addresses that describe what to do for each returned day (e.g., each target address may include a "print [day]" command that prints the day of the week based on the returned number).

The first time that Branch D is executed, the TAP may predict (e.g., at operation 202), using IT-TAGE techniques and tables, that target address B, which corresponds to Monday, is going to be executed. This prediction may be based on the GHV, the program counter, and the TAGE files. Accordingly, the instructions for printing "Monday" may be fetched and speculatively executed. However, the day retrieval function may complete and return a value of 4, which corresponds to Thursday. Accordingly, the TAP may determine (e.g., at decision block 204) that the predicted target address was incorrect.

The TAP may then determine a tag and a pattern for the branch (e.g., at operation 206). The tag may identify the branch as being "Branch D." For example, the tag may be "D." The pattern may identify the actual target address taken by Branch D, namely the target address for Thursday. For example, using folding and XORing logic, the TAP may generate a multi-bit pattern that identifies the target address for Thursday. Illustratively, the pattern may be referred to in this example as being "target address E." After determining the tag and pattern for the branch and target address, respectively, the TAP may store the tag and pattern in a target address pattern table (e.g., at operation 208).

At a later time, Branch D may once again be executed (e.g., at operation 210). Using the TAGE files and the information stored in the target address pattern table, the TAP may predict that target address E will be executed. The use of the target address pattern table to predict a target address is described in more detail in reference to FIG. 3. The TAP may accordingly cause the processor to fetch and speculatively execute the instructions associated with target address E. However, the TAP may determine that the predicted target address (target address E) is incorrect when the value returned by the day retrieval function is a 6, which corresponds to Saturday. Accordingly, the TAP may determine a new pattern for Branch D. The new pattern may correspond to the target address associated with the instructions for Saturday (e.g., target address G). The TAP may then update the target address pattern table to replace the pattern associated with branch D, which previously was "target address E," with the new pattern (target address G).

In some embodiments, the set of target address pattern data found in the target address pattern table may be indexed. Indexing can include organizing, establishing, systematizing, categorizing, or classifying. The indexing may be performed in a direct fashion (e.g., without changing/stopping, automatically) with respect to (e.g., related to) a branch instruction address. An instruction address may indicate the location of a computing device in a program sequence. As an example, when a branch execution reaches a location in a program sequence, the set of target address pattern data may be indexed/organized into a pattern table. The set of target address pattern data may be maintained. Maintaining can include preserving, retaining, sustaining, upholding, or conserving. The maintaining may be performed on an individual branch basis (e.g., with respect to separate/unique branches). The individual branch basis may be distinct (e.g., separate) from a set of global history data. The set of global history data may include behaviors, features, characteristics, values, parameters, parameter values, weights, or statistics related to past executions/utilizations of a branch. In embodiments, the set of global history data may include a Global History vector. The pattern table may be directly indexed with the branch instruction address and the pattern history may be maintained for each branch separately regardless of the Global History vector. As an example, the set of target address pattern data included in the ITTAGE table may be indexed in a direct fashion. The ITTAGE table may be indexed with the branch instruction address. The pattern history may be maintained for each branch distinct from the Global History Vector. Indexing the ITTAGE table may allow for the selection of a chosen target address prediction. Other examples of indexing the set of target address pattern data and maintaining the set of target address pattern data may also be possible.

As described herein, a respective element of the set of target address pattern data may be tagged in some embodiments. Tagging can include marking, indicating, highlighting, specifying, classifying, or signifying. The respective element can include a specific, distinct, or separate behavior, feature, characteristic, value, parameter, parameter value, weight, or statistic of the set of target address pattern data. The tagging may be performed using a respective branch tag with respect to a respective branch of the portion of the set of branches. A branch tag may include a symbol (e.g., #, $, !), character (e.g., S, D, R), phrase (e.g., static branch, dynamic branch, recent branch), word (e.g., static, dynamic, recent), or the like which indicates the respective element. In some embodiments, the tag may be a set of bits that are extracted from the instruction address for the branch. The set of bits may uniquely identify the branch instruction. As an example, the respective element of the set of target address pattern data may include static branches. Static branches may be tagged with a $ to indicate a designation of static. The respective element of the set of target address pattern data may correspond to the respective branch. The respective branch tag may be compared with a prospective branch tag. Comparing can include contrasting, investigating, assessing, evaluating, or examining. A prospective branch tag may include an expected, potential, or likely branch tag in an upcoming branch execution. The chosen target address prediction may be selected related to the portion of the set of branches. Selecting can include choosing, specifying, resolving, electing, designating, or identifying. The selecting may be performed utilizing the set of target address pattern data when the respective branch tag and the prospective branch tag match (e.g., are the same). In embodiments, the set of target address pattern data may be disregarded when the respective and prospective branch tags mismatch. The pattern table may have patterns for selective branches. The pattern may not be considered for indexing if a tag match is not found in the pattern table.

In some embodiments, the TAP may continuously monitor all of the branches that experience an incorrect target address prediction. If the target address pattern table becomes full, and a new branch has an incorrect target address prediction, the TAP may replace one of the branches in the target address pattern table with the new branch. For example, the TAP may replace the oldest branch (e.g., the branch that was last executed before any of the other branches in the target address pattern table) with the new branch. In some embodiments, branches may be removed from the target address pattern table after being in the table for a predetermined amount of time, after not being executed for a predetermined amount of time, or in any other way otherwise consistent with this disclosure.

In some embodiments, one or more of the operations of the method 200 described herein may be performed in alternative orders or may not be performed at all; furthermore, multiple operations may occur at the same time or as an internal part of a larger process. Likewise, while various operations of method 200 are described as being performed by a TAP, which may be a digital circuit or other hardware, they may also be performed by one or more components. For example, in some embodiments the method 200 (or various operations thereof) may be performed by a processor (e.g., a microprocessor), such as by executing program instructions.

FIG. 3 illustrates a flowchart of an example method 300 for predicting a target address of a selected branch using a set of ITTAGE tables and a target address pattern table, in accordance with embodiments of the present disclosure. In some embodiments, the method 300 may be executed by a computer system (e.g., by hardware or software in computer system 501 shown in FIG. 5). In some embodiments, the method 300 may be executed by a specialized digital circuit, such as a Target Address Predictor (TAP), within (or alongside) a microprocessor or other computer hardware. The method 300 may begin at operation 302, where the TAP may identify an incoming branch.

In some embodiments, the incoming branch may be a predicted branch that is being speculatively executed. For example, a branch predictor (e.g., a specialized digital circuit) may predict the direction of a branch before it is known for sure. In other embodiments, the identified branch may be known to be executed, but may have one or more conditional or unconditional jumps that are unknown. In some embodiments, the branch predictor and target address predictor may be performed by a combined circuitry.

In some embodiments, the TAP may determine or identify the tag of the incoming branch at operation 302. As described herein, the tag may be a unique identifier for the incoming branch. The TAP may extract information about the branch in order to identify the tag for the branch. After identifying the branch at operation 302, the TAP may determine whether the branch is in the target address pattern table at decision block 304.

In some embodiments, the TAP may compare the tag for the identified branch to all of the tags in the target address pattern table. If the TAP identifies a matching tag in the target address pattern table, the TAP may determine that the branch is in the target address pattern table. In some embodiments, the TAP may use the branch instruction address for the identified branch to index into the target address pattern table. The TAP may retrieve the record found at the indexed location of the target address pattern table. The TAP may then identify the tag found in the record, and compare that tag to the branch's tag. If the tags do not match, the TAP may determine that the branch is not in the target address pattern table at decision block 304. The TAP may then use the program counter and the GHV to index into the TAGE tables to identify a predicted target address, and the method 300 may end.

If the TAP determines that the branch is in the target address pattern table at decision block 304, the TAP may retrieve the pattern from the target address pattern table at operation 306. Generally, retrieving may include selecting, obtaining, choosing, specifying, resolving, electing, designating, identifying, copying, or receiving. As described herein, the pattern may be a set of bits that correspond to the predicted target address. After retrieving the pattern at operation 306, the TAP may generate an index at operation 308.

In some embodiments, the TAP may use the retrieved pattern, the program counter (PC), and the GHV to generate the index. The TAP may using folding and XORing logic to combine the PC, the GHV, and the retrieved pattern into an index which may be used with the largest TAGE file to predict the target address for the branch. As described herein, XOR-folding may relate to computing a hash twice the desired length, then XOR-ing the bits in the upper half with the bits in the lower half. The history pattern may comprise of bits extracted from the actual target address of the branch. The extracting may be performed by folding and XOR-ing logic.

After generating the index at operation 308, the TAP may retrieve a target address prediction at operation 310. The TAP may use the generated index to index into the largest TAGE file to determine the predicted target address. After retrieving the target address prediction at operation 310, the TAP may determine the final prediction at the operation 312. The final prediction may be made using the retrieved target address prediction and a default predication found in a local tag-less predictor.

For example, the TAP may retrieve a record from the largest TAGE file using the generated index. The TAP may then compare the tag found in that record to the tag for the branch. If the tags match, the TAP may use the target address found in the record as the final prediction. If the tags do not match, however, the TAP may use a default prediction from the local tag-less predictor as the final prediction. After determining the final prediction at operation 312, the method 300 may end.

In some embodiments, one or more of the operations of the method 300 described herein may be performed in alternative orders or may not be performed at all; furthermore, multiple operations may occur at the same time or as an internal part of a larger process. Likewise, while various operations of method 300 are described as being performed by a TAP, which may be a digital circuit or other hardware, they may also be performed by one or more components. For example, in some embodiments the method 300 (or various operations thereof) may be performed by a processor (e.g., a microprocessor), such as by executing program instructions.

Figure 4:
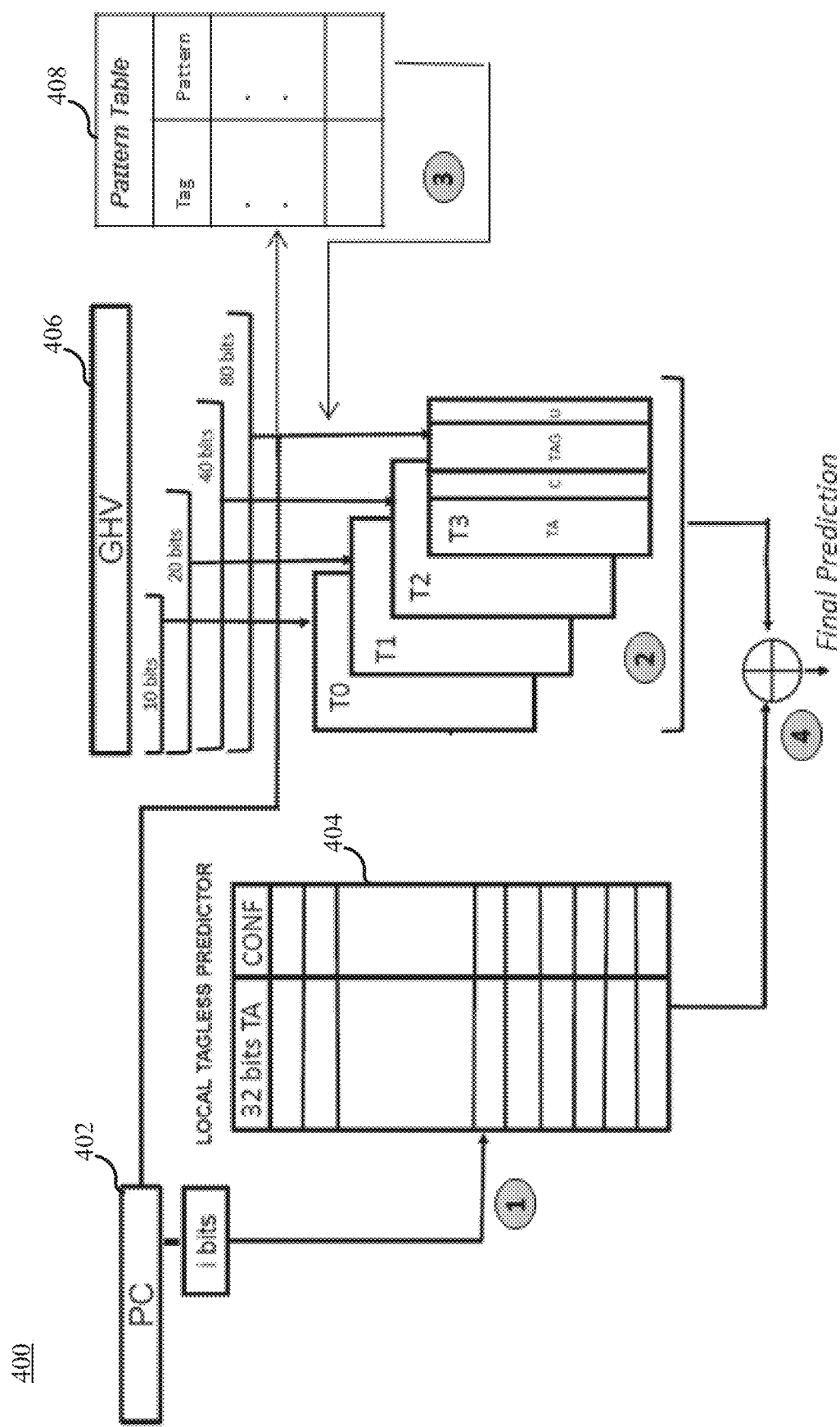
FIG. 4 depicts an example system for ITTAGE target address prediction using a set of target address pattern data in a pipelined microprocessor architecture, in accordance with embodiments of the present disclosure.

FIG. 4 depicts an example system for ITTAGE target address prediction using a set of target address pattern data in a pipelined microprocessor architecture, in accordance with embodiments of the present disclosure. A target address pattern history table may be utilized to index the longest history TAGE table for improved/enhanced/optimized performance. Local and default predictions may be derived from a tag-less local predictor indexed directly with an instruction address. The TAGE prediction maybe derived via an indirect TAGE target address prediction algorithm. A pattern table may be maintained for selective branches. The pattern table may be utilized along with the Global History Vector and program counter to index the last TAGE table (e.g., which uses the longest history). The final (e.g., chosen) target address prediction may be derived utilizing ITTAGE logic. The TAGE prediction may be selected if it exists. Otherwise, the default prediction may be selected.

The pattern table may trigger history maintenance for selective branches which are incorrectly predicted from the last table of the TAGE tables (e.g., with usage/confidence). Once triggered (e.g., an entry is made), the previous target address history may be maintained for future occurrences of the branch. The history pattern may comprise of bits extracted from the actual target address of the branch by folding and XOR-ing logic. The pattern table may be directly indexed with the branch instruction address and the pattern history may be maintained for individual branches separately (e.g., regardless/irrespective of the Global History Vector). As described herein, the pattern table may have patterns for selective branches and the pattern may not be considered for indexing if not tag match is found in the pattern table. Other examples may also be possible.

For example, as shown in FIG. 4, embodiments of the present disclosure include a TAP 400 having four TAGE files T0-T3, a local tag-less predictor 404, a global history vector (GHV) 406, and a pattern table 408 (also referred to herein as a target address pattern table). The GHV may be 80 bits long. The four TAGE files may have different sizes, and each TAGE table may correspond to a different number of bits of the GHV. In other words, only a portion of the GHV may be used, along with the program counter 402, to index some of the TAGE files. As shown in FIG. 4, the first TAGE file T0 uses the first 10 bits from the GHV, the second TAGE file T1 uses the first 20 bits from the GHV, the third TAGE file T2 uses the first 40 bits of the GHV, and the fourth TAGE file T3 uses all 80 bits of the GHV.

Each TAGE file T0-T3 may include a target address (TA) that stores the target address identifier (e.g., the whole target address, a portion thereof, a derived set of bits that corresponds to the target address, etc.), a confidence counter (C) that indicates a hysteresis of the predictor, a tag that corresponds to, and identifies, the branch, and a useful bit (U) for controlling the update policy for the entry. The pattern table 408 may include a set of tags that corresponds to the branches saved in the pattern table, and a set of patterns that is used to identify the target address for each branch, as described herein.

When a branch comes in, the program counter 402 for the branch may be sent to the local tag-less predictor 404 and to the pattern table 408. The program counter 402 may be used to index into the pattern table 408, and a set of bits (e.g., i bits in FIG. 4) from the program counter 402 may be used to identify the default prediction using the local tag-less predictor 404. If a record is found in the pattern table, the TAP 400 may compare the tag of the branch to the tag retrieved from the pattern table 408. If the tags match, the TAP 400 may use the retrieved pattern from the pattern table 408, along with the program counter 402 and the GHV 406 to generate an index. The TAP 400 may then use the generated index to identify a record in the largest TAGE table (e.g., table T3). If the tag of the record in the largest TAGE table T3 matches the branch tag, the TAP 400 may use the target address from the largest TAGE table T3 as the final prediction. Otherwise, the TAP 400 may use the default prediction from the local tag-less predictor 404 as the final prediction.

In some embodiments, if the tag in the pattern table 408 does not match the tag of the branch, indicating that the branch is not in the pattern table 408, the TAP 400 may search each of the TAGE files T0-T3 using the program counter 402 and the respective number of bits from the GHV 406. If hits are found in multiple TAGE files T0-T3, the hit found in the largest TAGE file T0-T3 may be used as the predicted target address. The target addresses found in the other TAGE files may be used as alternative predicted target addresses. For example, if hits are found in the first and third TAGE files T0 and T2, the target address from the third TAGE file T2 may be used as the final prediction, and the target address from the first TAGE file T0 may be used as an alternative predicted address.

Figure 5:
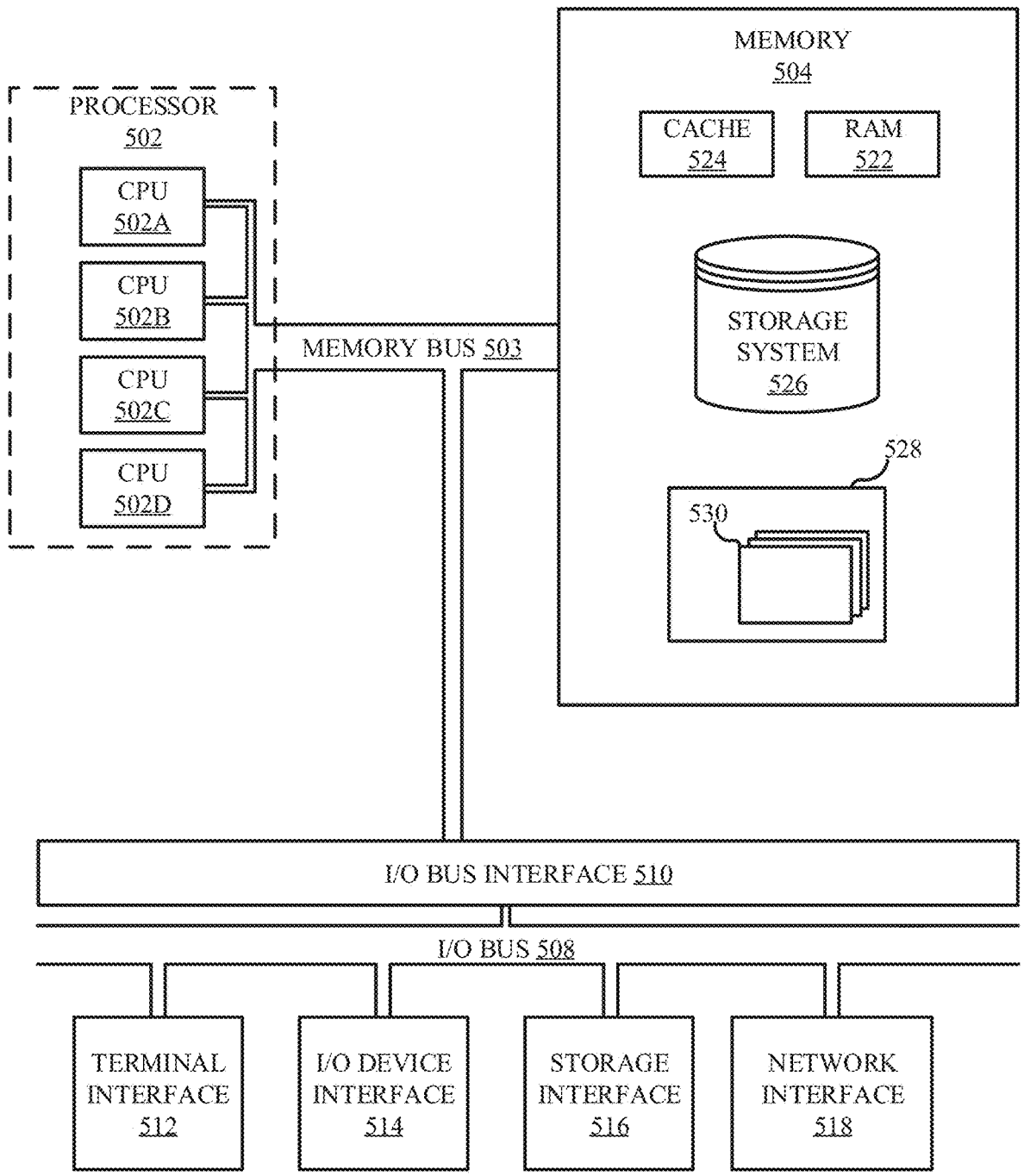
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A method for predicting a target address using a set of Indirect Target TAgged GEometric (ITTAGE) tables and a target address pattern table, the method comprising:
   generating a target address pattern table, wherein the target address pattern table includes one or more records, each record corresponding to a particular branch instruction that was incorrectly predicted from an ITTAGE table having the longest history;
   identifying a branch instruction to be executed by a processor;
   determining a first tag for the branch instruction, the first tag being a unique identifier that corresponds to the branch instruction;
   determining, using the first tag, that the branch instruction is in the target address pattern table;
   generating an index;
   determining, using the generated index and a largest ITTAGE table from the set of ITTAGE tables, a predicted target address for the branch instruction; and
   fetching instructions associated with the predicted target address.

2. The method of claim 1, wherein the determining, using the first tag, that the branch instruction is in the target address pattern table includes:
   retrieving, using a program counter associated with the branch instruction as a pattern table index, a record from the target address pattern table;
   comparing a second tag found in the retrieved record to the first tag for the branch instruction; and
   determining that the first tag and the second tag match.

3. The method of claim 1, wherein the generating the index includes:
   retrieving, using a program counter associated with the branch instruction as a pattern table index, a record from the target address pattern table;
   identifying, from the retrieved record, a pattern associated with the branch instruction, the pattern including a set of bits extracted from an actual target address associated with the branch instruction, the actual target address being a target address that was executed the last time the branch instruction was executed; and
   combining the program counter, the pattern, and a global history vector (GHV) using folding-XOR logic.

4. The method of claim 1, the method further comprising:
   speculatively executing the fetched instructions associated with the predicted target address.

5. The method of claim 1, wherein the generating the target address pattern table includes:
   determining, at a first time, that a first branch is not in the target address pattern table;
   deriving a target address prediction for the first branch using a program counter value for the first branch, a global history vector, and the set of ITTAGE tables;
   determining, by comparing the target address prediction to an actual target address associated with the first branch, that the target address prediction is incorrect;
   determining a third tag and a pattern for the first branch, wherein the third tag is a unique identifier for the first branch, and wherein the pattern is a set of bits extracted from the actual target address associated with the first branch; and
   storing the third tag and the pattern in the target address pattern table.

6. The method of claim 5, the method further comprising:
   continuously monitoring the first branch in response to the first branch being stored in the target address pattern table;
   determining a second predicted target address for the first branch using the set of ITTAGE tables, the global history vector, the program counter value, and the target address pattern table, wherein the second predicted target address is determined in response to the first branch executing at a second time that is subsequent to the first time;
identifying a correct target address for the first branch; and
updating the target address pattern table using the correct target address, wherein the updating includes replacing the pattern in the target address pattern table with a second pattern, the second pattern being generated using the correct target address.

7. A system comprising:
a memory; and
a processing circuit in communication with the memory, the processing circuit being configured to perform a method comprising:
generating a target address pattern table, wherein the target address pattern table includes one or more records, each record corresponding to a particular branch instruction that was incorrectly predicted from an ITTAGE table having the longest history;
identifying a branch instruction to be executed;
determining a first tag for the branch instruction, the first tag being a unique identifier that corresponds to the branch instruction;
determining, using the first tag, that the branch instruction is in the target address pattern table;
generating an index;
determining, using the generated index and a largest ITTAGE table from a set of ITTAGE tables, a predicted target address for the branch instruction; and
fetching instructions associated with the predicted target address.

8. The system of claim 7, wherein the determining, using the first tag, that the branch instruction is in the target address pattern table includes:
retrieving, using a program counter associated with the branch instruction as a pattern table index, a record from the target address pattern table;
comparing a second tag found in the retrieved record to the first tag for the branch instruction; and
determining that the first tag and the second tag match.

9. The system of claim 7, wherein the generating the index includes:
retrieving, using a program counter associated with the branch instruction as a pattern table index, a record from the target address pattern table;
identifying, from the retrieved record, a pattern associated with the branch instruction, the pattern including a set of bits extracted from an actual target address associated with the branch instruction, the actual target address being a target address that was executed the last time the branch instruction was executed; and
combining the program counter, the pattern, and a global history vector (GHV) using folding-XOR logic.

10. The system of claim 7, wherein the method performed by the processing circuit further comprises:
speculatively executing the fetched instructions associated with the predicted target address.

11. The system of claim 7, wherein the generating the target address pattern table includes:
determining, at a first time, that a first branch is not in the target address pattern table;
deriving a target address prediction for the first branch using a program counter value for the first branch, a global history vector, and the set of ITTAGE tables;
determining, by comparing the target address prediction to an actual target address associated with the first branch, that the target address prediction is incorrect;
determining a third tag and a pattern for the first branch, wherein the third tag is a unique identifier for the first branch, and wherein the pattern is a set of bits extracted from the actual target address associated with the first branch; and
storing the third tag and the pattern in the target address pattern table.

12. The system of claim 11, wherein the method performed by the processing circuit further comprises:
continuously monitoring the first branch in response to the first branch being stored in the target address pattern table;
determining a second predicted target address for the first branch using the set of ITTAGE tables, the global history vector, the program counter value, and the target address pattern table, wherein the second predicted target address is determined in response to the first branch executing at a second time that is subsequent to the first time;
identifying a correct target address for the first branch; and
updating the target address pattern table using the correct target address, wherein the updating includes replacing the pattern in the target address pattern table with a second pattern, the second pattern being generated using the correct target address.

13. A computer program product comprising a computer readable storage medium having program instructions embodied therewith, the program instructions executable by a processor to cause the processor to perform a method comprising:
generating a target address pattern table, wherein the target address pattern table includes one or more records, each record corresponding to a particular branch instruction that was incorrectly predicted from an ITTAGE table having the longest history;
identifying a branch instruction to be executed;
determining a first tag for the branch instruction, the first tag being a unique identifier that corresponds to the branch instruction;
determining, using the first tag, that the branch instruction is in the target address pattern table;
generating an index;
determining, using the generated index and a largest ITTAGE table from a set of ITTAGE tables, a predicted target address for the branch instruction; and
fetching instructions associated with the predicted target address.

14. The computer program product of claim 13, wherein the determining, using the first tag, that the branch instruction is in the target address pattern table includes:
retrieving, using a program counter associated with the branch instruction as a pattern table index, a record from the target address pattern table;
comparing a second tag found in the retrieved record to the first tag for the branch instruction; and
determining that the first tag and the second tag match.

15. The computer program product of claim 13, wherein the generating the index includes:
retrieving, using a program counter associated with the branch instruction as a pattern table index, a record from the target address pattern table;
identifying, from the retrieved record, a pattern associated with the branch instruction, the pattern including a set of bits extracted from an actual target address associated with the branch instruction, the actual target address being a target address that was executed the last time the branch instruction was executed; and combining the program counter, the pattern, and a global history vector (GHV) using folding-XOR logic.

16. The computer program product of claim 13, wherein the method performed by the processor further comprises:

speculatively executing the fetched instructions associated with the predicted target address.

17. The computer program product of claim 13, wherein the generating the target address pattern table includes:

determining, at a first time, that a first branch is not in the target address pattern table;

deriving a target address prediction for the first branch using a program counter value for the first branch, a global history vector, and the set of ITTAGE tables;

determining, by comparing the target address prediction to an actual target address associated with the first branch, that the target address prediction is incorrect;

determining a third tag and a pattern for the first branch, wherein the third tag is a unique identifier for the first branch, and wherein the pattern is a set of bits extracted from the actual target address associated with the first branch;

storing the third tag and the pattern in the target address pattern table;

continuously monitoring the first branch in response to the first branch being stored in the target address pattern table;

determining a second predicted target address for the first branch using the set of ITTAGE tables, the global history vector, the program counter value, and the target address pattern table, wherein the second predicted target address is determined in response to the first branch executing at a second time that is subsequent to the first time;

identifying a correct target address for the first branch; and updating the target address pattern table using the correct target address, wherein the updating includes replacing the pattern in the target address pattern table with a second pattern, the second pattern being generated using the correct target address.

* * * * *